(No Model.)  2 Sheets—Sheet 1.

C. E. ROBERTS.
EMERY GRINDING MACHINE.

No. 376,451. Patented Jan. 17, 1888.

Witnesses:
Lew E. Curtis
Taylor E. Brown

Inventor:
Charles E. Roberts
By Munday Evarts & Adcock
his Attorneys (No Model.) 2 Sheets—Sheet 2.

C. E. ROBERTS.
EMERY GRINDING MACHINE.

No. 376,451. Patented Jan. 17, 1888.

Witnesses:
Lew E. Curtis.
Taylor E. Brown.

Inventor:
Charles E. Roberts
By Munday Evarts & Adcock
his Attorneys.

N. PETERS, Photo-Lithographer, Washington, D. C.

UNITED STATES PATENT OFFICE.

CHARLES E. ROBERTS, OF CHICAGO, ILLINOIS.

EMERY GRINDING-MACHINE.

SPECIFICATION forming part of Letters Patent No. 376,451, dated January 17, 1888.

Application filed September 28, 1886. Serial No. 214,723. (No model.)

*To all whom it may concern:*

Be it known that I, CHARLES E. ROBERTS, a citizen of the United States, residing in Chicago, in the county of Cook and State of Illinois, have invented a new and useful Improvement in Emery Grinding-Machines, of which the following is a specification.

This invention is an improvement upon the machines heretofore employed for grinding the edge faces of nuts and bolt-heads. I employ therein two emery-grinders, (which may be the lateral rims of emery-wheels,) placed end to end, and having a reciprocating movement toward and from each other, as well as a rotary movement, and in connection therewith a nut or bolt holder moving transversely to the grinders and carrying the nut or bolt into the space between them, where it can be operated upon. The nut-holder is also peculiarly constructed, as well as the devices for reciprocating the grinders. Thus the nut-holder is made laterally yielding, so that it will automatically center itself between the two grinders and equalize the work done by them, thereby avoiding the cutting away of one side of the nut more than the other. The contact of the grinders with the nut is also cushioned by the employment of springs operating upon the levers, whereby the grinders are reciprocated. These springs also tend to equalize the work done by the two grinders. The grinders and the nut-holder are reciprocated in either direction by a single movement of a single lever, as hereinafter explained, and the holder is caused to automatically release the nut after each grinding operation by mechanism which is also described below. These and all other features of my invention will be fully understood by reference to the annexed drawings, forming part of this specification, in which—

Figure 1:
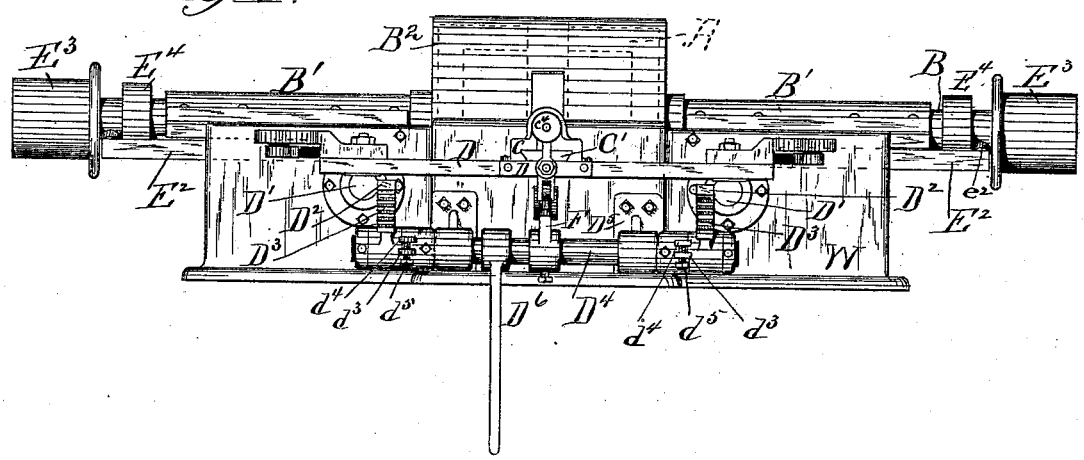
Figure 2:
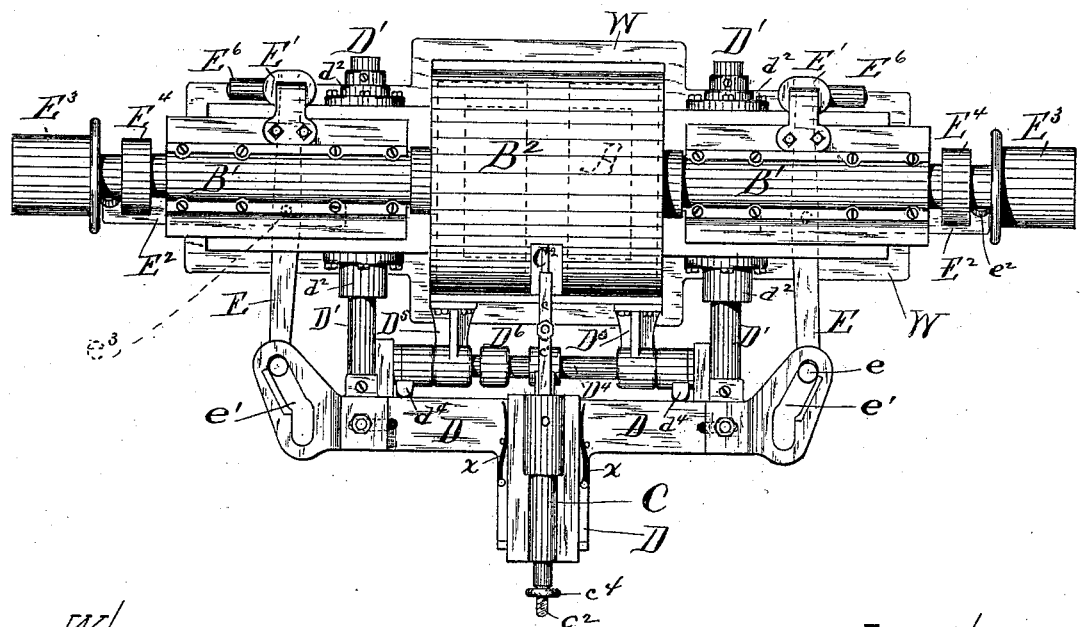
Figure 3:
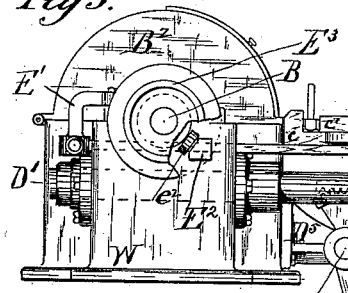
Figure 5:
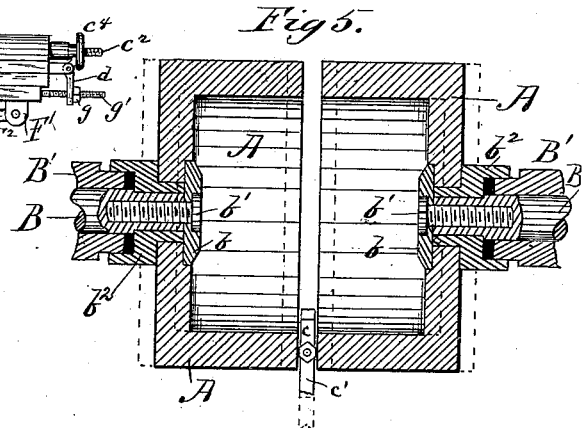
Figure 6:
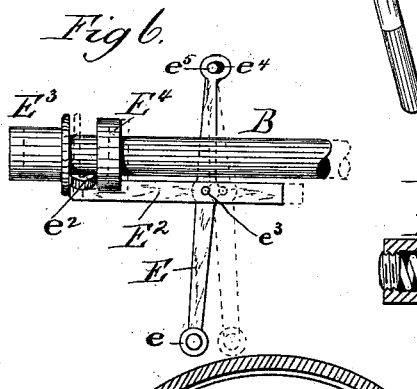
Figure 7:
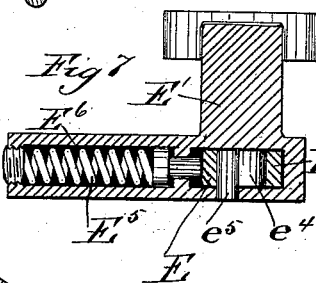
Figure 8:
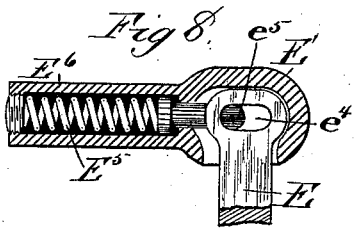
Figure 4:
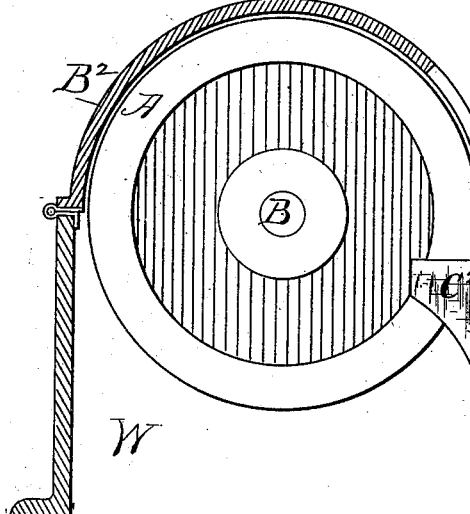
Figure 9:
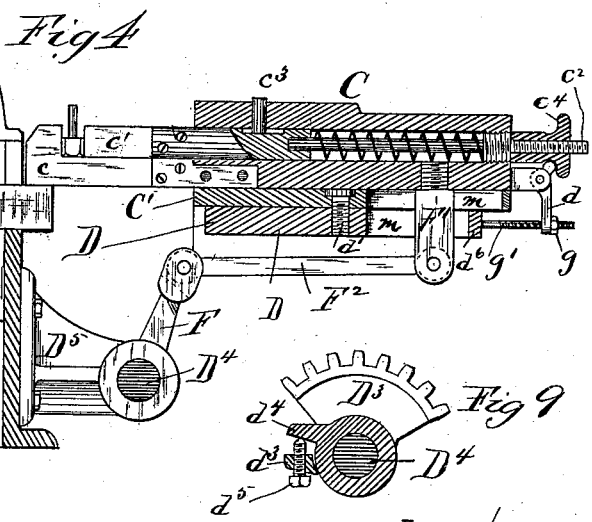
Figure 9:
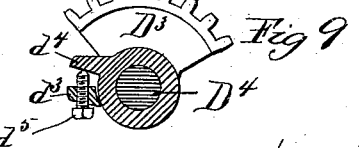

Figure 1 is a front view, and Fig. 2 a plan, of my invention. Fig. 3 is an end view of the same, part of the exterior being broken away to disclose the hidden parts. Fig. 4 is a central transverse vertical section of the invention, enlarged. Fig. 5 is a central longitudinal section of the grinders. Fig. 6 is a detail of one of the grinder-journals and its reciprocating lever. Figs. 7 and 8 are respectively vertical and horizontal sections showing the manner in which the levers for reciprocating the grinders are fulcrumed. Fig. 9 is a detail of part of the machine.

In said drawings, W represents a bed-frame, upon which the various parts of the machine are supported.

A A represent the rotating emery-grinders, which in this instance are cup-shaped wheels, the edges of the rims forming the grinding-faces. They are fastened to the end of spindles B B, placed end to end with their axes in the same line and rotating in boxes B' B', and the construction of this attachment which I prefer is the following: Entering the end of each spindle and passing through the center of the wheel, and also through a washer, $b$, lying against the inside of the wheel center, is a headed screw, $b'$. A collar, $b^2$, encircles the end of the journal and preferably surrounds the end of the box B', as illustrated. Between the box and collar are spaces, as shown, which allow the endwise movement of the wheel and its journal. A shield, $B^2$, incloses the wheels and prevents the escape of sparks, &c. Into the space between the adjacent rims of these grinding-wheels the nut or bolt-head is carried by devices now to be described. A transverse movable slide, C, supported upon a longitudinal carriage, D, is provided with a stationary jaw, $c$, and a movable jaw, $c_j$ between which the nut or bolt-head may be clamped. The latter of these jaws is upon the inner end of a spring-rod, $c^2$, confined in the slide, the spring of said rod acting toward the nut. A guide-pin, $c^3$, may enter a recess in this rod to prevent its rotation. Upon the outer end said rod carries an adjustable head, $c^4$, which acts, in connection with the trip $d$, to draw the rod away from the nut being ground and release it, as will be described in a subsequent part hereof. The slide is not rigidly secured to the carriage D, but is pivotally held thereto by the piece C', dovetailed within the slide and secured to the carriage by the screw $d'$, passing through said piece C' into the carriage, the object of this being to give the inner or nut-carrying end such freedom of lateral movement that if either wheel exerts a greater force upon the nut than the other the slide may yield toward the latter wheel, and thus equalize the force exerted by them both. In other words, the slide automatically centers itself between the operating-faces of the wheels, and this takes place whether the wheels be unevenly adjusted, or one be worn more than the other, or the nut be presented at one side of the center. A rest, $C^2$, secured to the bed, sustains the inner end of the slide while the grinders are at work.

The carriage D rests upon the ends of transverse sliding bars D', having bearings $d^2$ on either side of the bed. Attached to the rods (or to the carriage) are rack-bars $D^2$, meshing with which are toothed segments $D^3$, loose upon the longitudinal shaft $D^4$ and actuated by the contact of projection $d^3$ upon the shaft with projection $d^4$ upon the hubs of the segments. The shaft $D^4$ is supported in brackets $D^5$ from the bed of the machine. The shaft $D^4$ is operated by the hand-lever $D^6$, and through the segment and rack moves the carriage and its supporting-bars backward and forward. These movements of the carriage are caused to reciprocate the grinders by means of the levers E, which are fulcrumed in the brackets E', are actuated by the pins $e$, working in the diagonal slots $e'$ in the carriage, and are connected to the grinder-shafts by bars $E^2$ and roller $e^2$, the latter lying between drive-pulleys $E^3$ and collars $E^4$, both upon the grinder-shafts, the bars $E^2$ and the levers being joined by pins $e^3$, as illustrated.

The fulcrum ends of the levers are provided with elongated slots $e^4$, which are entered by the retaining-pins $e^5$. The levers are inclosed in the brackets E', with space for a limited lateral movement therein, and this lateral movement takes against the power of the springs $E^5$, which are confined in a lateral housing, $E^6$, attached to the bracket. The springs press the wheels up to their work, thereby rendering the action elastic and allowing either wheel to yield in case the nut being ground projects unduly upon either side.

The nut-holder is reciprocated back and forth from the same shaft $D^4$, so that a single movement of the hand-lever $D^6$ operates both mechanisms, a crank, F, upon said shaft being connected to a foot, F', depending from the nut-holder and passing through the openings $m\ m$ in the piece C' and carriage by the link or pitman $F^2$. As it is important that the nut should be in position between the grinders before the latter are moved up to its position, I attach the crank F rigidly to the shaft, while the segments $D^3$ are loosely mounted thereon, and are actuated enough later than the crank to insure this result by the contact of the projections $d^3$ upon the shaft with the projections $d^4$ upon the hubs of the segments. The extent of this difference in timing may be changed by adjusting the screw $d^5$ in the projection $d^3$. After the grinding is done the hand-lever is given a reverse movement, which forces back the nut-holder, and by the contact of the foot F' with the portion $d^6$ of the carriage the latter is also returned, though a little later in point of time.

The trip $d$ swings upon its pivotal attachment to the slide, and its movement is regulated by the nut $g$ upon screw $g'$, projecting from the carriage and passing through the lower end of the trip. It will be noticed from Fig. 4 that the lower end of the trip will be detained by the nut $g$ while the foot F' is moving from the position shown in said figure to contact with the point $d^5$. This results in the oscillation of the trip, the opening of movable clamping-jaw of the holder, and the automatic release of the nut. This operation may be timed to take place earlier or later by adjusting the nut $g$.

Having now described my invention, I desire to state that I do not wish to be limited to the precise construction shown, as it is very obvious that there are equivalents for many of the parts, and the position of some of them may be changed.

The ends of the carriage D—that is, the portion having the diagonal slots—I prefer to make separate and adjustable upon the body of the carriage, as illustrated. This permits adjustment as the wheels wear away. Attached to the carriage D on each side of the transverse movable slide C are a pair of springs, $x\ x$, which serve to hold the transverse movable slide C in a central position and allow said slide to yield in either direction.

I claim—

1. In combination with the reciprocating grinders and holder of a nut-grinding machine, a shaft having a crank fast thereon and connected to the nut-holder and segments loose upon the shaft and connected to the grinders, the projections $d^3$ and $d^4$ upon the shaft and segments, respectively, and the hand-lever for actuating the shaft, substantially as specified.

2. The combination, with the grinders, of the levers connected thereto and to diagonal slots in the carriage, the carriage, and devices for moving the carriage backward and forward, substantially as specified.

3. The cup-shaped emery-wheel, the washer, the screw, and the collar $b^2$, in combination with the shaft to which the wheel is attached and the box, said collar encircling the box, and space being left between the abutting faces of the collar and box to allow the endwise movement of the wheel, substantially as specified.

4. The nut-holding slide having the movable spring-jaw provided with the head $c^4$, in combination with the trip $d$, controlled from the carriage, the carriage, and devices for reciprocating said slide, substantially as specified.

5. The combination of two emery-grinders placed end to end with their axes coincident, both rotating and both reciprocating, and adapted to operate simultaneously upon opposite sides of the nut or bolt-head, and a nut or bolt holder for carrying the nut or bolt into the space between the grinders, substantially as specified.

6. The combination of two rotating and reciprocating grinders adapted to operate upon opposite sides of the nut or bolt-head, and a laterally-yielding nut or bolt holder, substantially as specified.

7. The combination, with the nut or bolt holder, of two endwise-reciprocating grinders rotating in the same direction and the levers and interposed springs for moving and cushioning the action of the grinders, substantially as specified.

8. The combination, with the two rotating and reciprocating grinders and the nut-holder, of means consisting of a trip acting upon the movable jaw of the nut-clamp for automatically releasing the nut from the holder after the grinding operation, substantially as specified.

9. The combination, with the rotary reciprocating grinders and the reciprocating nut-holder, of the hand-lever and the intervening mechanism connecting the said lever with the grinders and holder, substantially as specified.

10. The combination, with the levers for reciprocating the grinders, of springs acting upon said levers to cushion the power exerted thereby, substantially as specified.

CHARLES E. ROBERTS.

Witnesses:
H. M. MUNDAY,
EDMUND ADCOCK.